(12) United States Patent
Mittal et al.

(10) Patent No.: US 8,706,747 B2
(45) Date of Patent: Apr. 22, 2014

(54) SYSTEMS AND METHODS FOR SEARCHING USING QUERIES WRITTEN IN A DIFFERENT CHARACTER-SET AND/OR LANGUAGE FROM THE TARGET PAGES

(75) Inventors: Vibhu Mittal, Sunnyvale, CA (US); Jay M. Ponte, Mountain View, CA (US); Mehran Sahami, Redwood City, CA (US); Sanjay Ghemawat, Mountain View, CA (US); John A. Bauer, Mountain View, CA (US)

(73) Assignee: Google Inc., Mountain View, CA (US)

( * ) Notice: Subject to any disclaimer, the term of this patent is extended or adjusted under 35 U.S.C. 154(b) by 656 days.

(21) Appl. No.: 10/676,724

(22) Filed: Sep. 30, 2003

(65) Prior Publication Data

US 2004/0261021 A1    Dec. 23, 2004

Related U.S. Application Data

(63) Continuation-in-part of application No. 09/748,431, filed on Dec. 26, 2000, now Pat. No. 7,136,854.

(60) Provisional application No. 60/216,530, filed on Jul. 6, 2000.

(51) Int. Cl.
*G06F 7/00* (2006.01)
*G06F 17/30* (2006.01)
*G06F 17/21* (2006.01)

(52) U.S. Cl.
USPC .............................. 707/760; 707/756; 704/10

(58) Field of Classification Search
USPC ............... 707/3, 5, 4; 704/7, 9; 709/201, 223; 340/995.12
See application file for complete search history.

(56) References Cited

U.S. PATENT DOCUMENTS

| | | | |
|---|---|---|---|
| 4,674,112 A | | 6/1987 | Kondraske et al. |
| 4,754,474 A | | 6/1988 | Feinson |
| 5,337,347 A | | 8/1994 | Halstead-Nussloch et al. |
| 5,495,608 A | | 2/1996 | Antoshenkov |
| 5,634,053 A | * | 5/1997 | Noble et al. ...................... 707/4 |
| 5,634,134 A | * | 5/1997 | Kumai et al. ................. 715/223 |

(Continued)

FOREIGN PATENT DOCUMENTS

| | | |
|---|---|---|
| CA | 2511293 | 6/2004 |
| EA | CA2323856 | 4/2002 |

(Continued)

OTHER PUBLICATIONS

Resnik P. et al., "The Web as a Parallel Corpus", Computational Linguistics MIT Press for Assoc. Comput. Linguistics USA, Jul. 2002, pp. 1-29, v. 29, No. 3.

(Continued)

*Primary Examiner* — Susan Chen
(74) *Attorney, Agent, or Firm* — Fish & Richardson P.C.

(57) ABSTRACT

Methods and apparatus consistent with the invention allow a user to submit an ambiguous search query and to receive relevant search results. Queries can be expressed using character sets and/or languages that are different from the character set and/or language of at least some of the data that is to be searched. A translation between these character sets and/or languages can be performed by examining the use of terms in aligned text. Probabilities can be associated with each possible translation. Refinements can be made to these probabilities by examining user interactions with the search results.

18 Claims, 15 Drawing Sheets

(56) References Cited

U.S. PATENT DOCUMENTS

| | | | |
|---|---|---|---|
| 5,701,469 A | 12/1997 | Brandli et al. | |
| 5,724,593 A * | 3/1998 | Hargrave et al. | 704/7 |
| 5,745,894 A | 4/1998 | Burrows et al. | |
| 5,758,145 A | 5/1998 | Bhargava et al. | |
| 5,778,157 A | 7/1998 | Oatman et al. | |
| 5,818,437 A | 10/1998 | Grover et al. | |
| 5,845,273 A | 12/1998 | Jindal | |
| 5,915,251 A | 6/1999 | Burrows et al. | |
| 5,945,928 A | 8/1999 | Kushler et al. | |
| 5,953,073 A | 9/1999 | Kozina et al. | |
| 5,953,541 A | 9/1999 | King et al. | |
| 5,974,121 A | 10/1999 | Perera | |
| 5,978,792 A | 11/1999 | Bhargava et al. | |
| 5,978,820 A | 11/1999 | Mase et al. | |
| 5,987,446 A * | 11/1999 | Corey et al. | 1/1 |
| 6,011,554 A | 1/2000 | King et al. | |
| 6,018,736 A | 1/2000 | Gilai et al. | |
| 6,026,411 A | 2/2000 | Delp | |
| 6,038,365 A | 3/2000 | Yamagami | |
| 6,061,718 A | 5/2000 | Nelson | |
| 6,070,140 A | 5/2000 | Tran | |
| 6,107,944 A * | 8/2000 | Behr et al. | 340/995.12 |
| 6,131,082 A * | 10/2000 | Hargrave et al. | 704/7 |
| 6,169,999 B1 | 1/2001 | Kanno | |
| 6,226,635 B1 | 5/2001 | Katariya | |
| 6,247,010 B1 * | 6/2001 | Doi et al. | 707/3 |
| 6,256,630 B1 | 7/2001 | Gilai et al. | |
| 6,278,992 B1 | 8/2001 | Curtis et al. | |
| 6,286,064 B1 | 9/2001 | King et al. | |
| 6,307,548 B1 | 10/2001 | Flinchem et al. | |
| 6,307,549 B1 | 10/2001 | King et al. | |
| 6,353,820 B1 | 3/2002 | Edwards et al. | |
| 6,360,196 B1 | 3/2002 | Poznanski et al. | |
| 6,377,961 B1 | 4/2002 | Ryu | |
| 6,377,965 B1 | 4/2002 | Hachamovitch et al. | |
| 6,421,662 B1 | 7/2002 | Karten | |
| 6,453,315 B1 * | 9/2002 | Weissman et al. | 707/5 |
| 6,470,333 B1 * | 10/2002 | Baclawski | 1/1 |
| 6,484,179 B1 | 11/2002 | Roccaforte | |
| 6,529,903 B2 | 3/2003 | Smith et al. | |
| 6,542,170 B1 | 4/2003 | Williams et al. | |
| 6,601,026 B2 * | 7/2003 | Appelt et al. | 704/9 |
| 6,606,486 B1 | 8/2003 | Cubbage et al. | |
| 6,633,846 B1 | 10/2003 | Bennett et al. | |
| 6,714,905 B1 * | 3/2004 | Chang et al. | 704/9 |
| 6,795,822 B1 | 9/2004 | Matsumoto et al. | |
| 6,947,770 B2 | 9/2005 | Rydbeck | |
| 6,968,179 B1 | 11/2005 | De Vries | |
| 7,103,854 B2 | 9/2006 | Fuchs et al. | |
| 7,120,574 B2 * | 10/2006 | Troyanova et al. | 704/9 |
| 7,149,550 B2 | 12/2006 | Kraft | |
| 7,159,191 B2 | 1/2007 | Koivuniemi | |
| 7,283,992 B2 * | 10/2007 | Liu et al. | 1/1 |
| 7,366,668 B1 | 4/2008 | Franz et al. | |
| 7,369,988 B1 | 5/2008 | Thenthiruperai | |
| 7,380,724 B2 | 6/2008 | Unruh | |
| 7,461,061 B2 | 12/2008 | Aravamudan et al. | |
| 7,529,741 B2 | 5/2009 | Aravamudan et al. | |
| 7,536,384 B2 | 5/2009 | Venkataraman et al. | |
| 7,539,676 B2 | 5/2009 | Aravamudan et al. | |
| 7,644,054 B2 | 1/2010 | Garg et al. | |
| 7,647,228 B2 | 1/2010 | Silvera et al. | |
| 7,657,526 B2 | 2/2010 | Aravamudan et al. | |
| 7,729,913 B1 | 6/2010 | Lee et al. | |
| 7,737,999 B2 | 6/2010 | Ardhanari et al. | |
| 7,739,280 B2 | 6/2010 | Aravamudan et al. | |
| 7,774,294 B2 | 8/2010 | Aravamudan et al. | |
| 7,774,341 B2 | 8/2010 | Aravamudan et al. | |
| 7,779,011 B2 | 8/2010 | Venkataraman et al. | |
| 7,788,266 B2 | 8/2010 | Venkataraman et al. | |
| 7,792,815 B2 | 9/2010 | Aravamudan et al. | |
| 7,835,998 B2 | 11/2010 | Aravamudan et al. | |
| 7,840,405 B1 | 11/2010 | Lee et al. | |
| 2001/0003184 A1 | 6/2001 | Ching et al. | |
| 2001/0032074 A1 | 10/2001 | Harris et al. | |
| 2002/0019731 A1 | 2/2002 | Masui et al. | |
| 2002/0021311 A1 | 2/2002 | Shechter et al. | |
| 2002/0028697 A1 | 3/2002 | Davies | |
| 2002/0038308 A1 | 3/2002 | Cappi | |
| 2002/0059069 A1 | 5/2002 | Hsu et al. | |
| 2002/0077811 A1 | 6/2002 | Koenig et al. | |
| 2002/0087514 A1 | 7/2002 | Payne et al. | |
| 2002/0091511 A1 | 7/2002 | Hellwig et al. | |
| 2002/0133481 A1 | 9/2002 | Smith et al. | |
| 2002/0152203 A1 | 10/2002 | Ostergaard et al. | |
| 2002/0184197 A1 | 12/2002 | He et al. | |
| 2002/0184206 A1 | 12/2002 | Evans | |
| 2002/0194388 A1 | 12/2002 | Boloker et al. | |
| 2003/0023420 A1 | 1/2003 | Goodman | |
| 2003/0035519 A1 | 2/2003 | Warmus | |
| 2003/0054830 A1 | 3/2003 | Williams et al. | |
| 2003/0073451 A1 | 4/2003 | Kraft | |
| 2003/0078914 A1 | 4/2003 | Witbrock | |
| 2003/0088554 A1 | 5/2003 | Ryan et al. | |
| 2003/0104839 A1 | 6/2003 | Kraft et al. | |
| 2003/0105623 A1 | 6/2003 | Cyr et al. | |
| 2003/0125947 A1 | 7/2003 | Yudkowsky | |
| 2003/0135490 A1 | 7/2003 | Barrett et al. | |
| 2003/0149686 A1 | 8/2003 | Drissi | |
| 2003/0171929 A1 | 9/2003 | Falcon et al. | |
| 2003/0187658 A1 | 10/2003 | Selin et al. | |
| 2003/0204394 A1 | 10/2003 | Garudadri et al. | |
| 2004/0128135 A1 | 7/2004 | Anastasakos et al. | |
| 2004/0163032 A1 | 8/2004 | Guo et al. | |
| 2004/0192355 A1 | 9/2004 | Nowlan | |
| 2004/0252051 A1 | 12/2004 | Johnson | |
| 2004/0261021 A1 | 12/2004 | Mittal et al. | |
| 2005/0027524 A1 | 2/2005 | Wu et al. | |
| 2005/0060448 A1 | 3/2005 | Gutowitz | |
| 2005/0071332 A1 | 3/2005 | Ortega et al. | |
| 2005/0102259 A1 | 5/2005 | Kapur | |
| 2005/0114312 A1 | 5/2005 | Mosescu | |
| 2005/0131687 A1 | 6/2005 | Sorrentino | |
| 2005/0188330 A1 | 8/2005 | Griffin | |
| 2005/0198056 A1 | 9/2005 | Dumais et al. | |
| 2005/0246365 A1 | 11/2005 | Lowsles et al. | |
| 2005/0270270 A1 | 12/2005 | Chadha | |
| 2005/0289141 A1 | 12/2005 | Baluja | |
| 2005/0289479 A1 | 12/2005 | Yoshida et al. | |
| 2006/0099963 A1 | 5/2006 | Stephens | |
| 2006/0142997 A1 | 6/2006 | Jakobsen et al. | |
| 2006/0230350 A1 | 10/2006 | Baluja | |
| 2007/0061211 A1 | 3/2007 | Ramer | |
| 2007/0061244 A1 | 3/2007 | Ramer | |
| 2007/0061321 A1 | 3/2007 | Venkataraman et al. | |
| 2007/0195063 A1 | 8/2007 | Wagner et al. | |
| 2008/0104043 A1 | 5/2008 | Garg et al. | |
| 2010/0093404 A1 | 4/2010 | Baek et al. | |

FOREIGN PATENT DOCUMENTS

| | | |
|---|---|---|
| EP | 0 597 611 | 5/1994 |
| EP | 1 072 984 | 1/2001 |
| EP | 1 347 362 | 9/2003 |
| JP | 09-259144 | 10/1997 |
| JP | 2000-163441 | 6/2000 |
| JP | 2002-092018 | 3/2002 |
| JP | 2002-251410 | 9/2002 |
| KR | 2002-0084739 | 11/2002 |
| KR | 20030044949 A | 6/2003 |
| RU | 2039376 C1 | 7/1995 |
| WO | WO 98/00833 | 1/1998 |
| WO | WO 0075808 A1 | 12/2000 |
| WO | WO 01/80079 | 10/2001 |
| WO | WO 02/01400 | 1/2002 |
| WO | WO 02/09302 | 1/2002 |
| WO | WO 03042870 A1 | 5/2003 |
| WO | WO 2005/091825 | 10/2005 |

OTHER PUBLICATIONS

Official Decision of Grant from related Russian application No. 2006114696 issued on Jan. 23, 2009.
Communication from related European Patent Application No. 09151235.0 mailed Jul. 6, 2009, 7 pages.

(56) References Cited

OTHER PUBLICATIONS

Search Report from related European Patent Application No. 09151235.0 mailed May 4, 2009, 7 pages.
Australian Patent Office, Australian Application No. 2005259925, filed Jun. 24, 2005, in Office Action, mailed Feb. 18, 2010, 3 pages.
United States Patent and Trademark Office, U.S. Appl. No. 10/876,989, filed Jun. 30, 2005, in Office Action Mailed Jan. 3, 2007, 18 pages.
United States Patent and Trademark Office, U.S. Appl. No. 11/173,702, filed Jun. 30, 2005, in Office Action Mailed Aug. 13, 2007, 20 pages.
United States Patent and Trademark Office, U.S. Appl. No. 10/876,989, filed Jun. 30, 2005, in Office Action Mailed Sep. 18, 2007, 14 pages.
United States Patent and Trademark Office, U.S. Appl. No. 11/173,702, filed Jun. 30, 2005, in Office Action Mailed Apr. 1, 2008, 18 pages.
United States Patent and Trademark Office, U.S. Appl. No. 11/173,702, filed Jun. 30, 2005, in Office Action Mailed Dec. 29, 2008, 29 pages.
United States Patent and Trademark Office, U.S. Appl. No. 10/876,989, filed Jun. 30, 2005, in Office Action Mailed Mar. 9, 2009, 23 pages.
United States Patent and Trademark Office, U.S. Appl. No. 11/173,702, filed Jun. 30, 2005, in Office Action Mailed Aug. 17, 2009, 18 pages.
United States Patent and Trademark Office, U.S. Appl. No. 10/876,989, filed Jun. 30, 2005, in Office Action Mailed Dec. 22, 2009, 23 pages.
European Patent Office, Supplementary European Search Report & Written Opinion for Application No. EP 05763513.8, mailed Jul. 23, 2009, 3 pages.
Wildstrom, Stephen H., "Honey, I Shrunk the Keyboard," Business Week, May 10, 2004, p. 30.
Young, Lee W., Authorized Officer, International Searching Authority, International application No. PCT/US2006/26152, filed Jun. 30, 2006, in International Search Report and Written Opinion, mailed Feb. 11, 2008, 9 pages.
Kuwahara, Yoshiko, Authorized Officer, International Bureau of WIPO, International application No. PCT/US2006/26152, filed Jun. 30, 2006, in International Preliminary Report on Patentability, mailed Mar. 26, 2009, 7 pages.
Whitfield, Jacqueline A., Special Project Assistant, International Searching Authority, International application No. PCT/US05/22962, filed Jun. 24, 2005, in International Search Report and Written Opinion, mailed Sep. 7, 2007, 13 pages.
Jun Gong and Peter Tarasewich, Alphabetically Constrained Keypad Designs for Text Entry on Mobile Devices, HCI Laboratory, College of Computer & Information Science, Northeastern University, pp. 211-220, Apr. 2-7, 2005.
International Preliminary Report on Patentability for Application No. PCT/US2007/082534, dated May 7, 2009, 6 pages.
"Problem 6-Mobile phones" ACM SPPC International Collegiate Programming Contest 2003, Sep. 20, 2003, http://www.sspcontest.org.2003/P6_Mobiles.pdf, 2 pages.
United States Patent and Trademark Office, U.S. Appl. No. 11/173,702, filed Jun. 3, 2005, in Office Action Mailed May 11, 2010, 17 pages.
United State Patent and Trademark Office, U.S. Appl. No. 10/876,989, filed Jun. 30, 2005, in Office Action Mailed Jun. 6, 2008, 17 pages.
Office Action dated Jul. 25, 2012 from related European Patent Application No. 11172796.2, Jul. 25, 2012, 6 pages.
Office Action issued in Chinese Patent Application No. 200680031513.2, May 24, 2010, 10 pages.
Office Action issued in Korean Patent Application No. 2011-7020833, Nov. 3, 2011, 6 pages.
Office Action issued in Korean Patent Application No. 2006-7006282, Mar. 10, 2011, 7 pages.
Search Report from related European Patent Application No. 11172796.2 mailed Oct. 26, 2011, 6 pages.
Office Action from related Japanese Patent Application No. 2010-161104 dated Jun. 13, 2012, 5 pages.

* cited by examiner

| TERM | LOCATION (DOCUMENT) |
|---|---|
| 3 | DOCUMENT 1 |
| BAR | DOCUMENT 3 |
| CAR | DOCUMENT 1 |
| CHAMPAGNE | DOCUMENT 3 |
| ITEMS | DOCUMENT 3 |
| RENTAL | DOCUMENTS 1 AND 2 |
| REPAIR | DOCUMENT 1 |
| VIDEO | DOCUMENT 2 |
| WINE | DOCUMENT 3 |

FIG. 4A

| TERM | LOCATION (DOCUMENT) |
|---|---|
| 3 | DOCUMENT 1 |
| 227 | DOCUMENTS 1 AND 3 |
| 242672463 | DOCUMENT 3 |
| 48367 | DOCUMENT 3 |
| 736825 | DOCUMENTS 1 AND 2 |
| 737247 | DOCUMENTS 1 |
| 84336 | DOCUMENT 2 |
| 8463 | DOCUMENT 3 |

FIG. 5C

|  | 802 | 804 | 806 | 800 |

| Romaji Term | Kanji Term | Probability (%) |
|---|---|---|
| <Bank>$_{romaji}$ | <Financial institution>$_{kanji}$ | 0.4 |
|  | <Steep slope>$_{kanji}$ | 0.3 |
|  | <Airplane maneuver>$_{kanji}$ | 0.2 |
|  | <Other>$_{kanji}$ | 0.1 |
| <Car>$_{romaji}$ | <Automobile>$_{kanji}$ | 0.9 |
|  | <Other>$_{kanji}$ | 0.1 |
| <House>$_{romaji}$ | <A dwelling>$_{kanji}$ | 0.7 |
|  | <To contain>$_{kanji}$ | 0.25 |
| <Plane>$_{romaji}$ | <Airplane>$_{kanji}$ | 0.6 |
|  | <Flat surface>$_{kanji}$ | 0.25 |
|  | <Carpenter's tool>$_{kanji}$ | 0.1 |
|  | <Other>$_{kanji}$ | 0.05 |

808 — Bank row
810 — Car row
812 — House row
814 — Plane row

FIG. 8

| 1 | Casa |
|---|---|
| 2 | Casa |
| 3 | Casa |
| 4 | Casa |
| 5 | Casa |
| 6 | Grande |
| 7 | Grande |
| 8 | Grande |
| 9 | Grande |
| 10 | Grande |

House (label for table above)

Probability(house=casa): 5/10 = 0.5

Probability(house=grande): 5/10 = 0.5

FIG. 11A

| 1 | Casa |
|---|---|
| 2 | Casa |
| 3 | Casa |
| ... | Casa |
| 13 | Casa |
| 14 | Casa |
| 15 | Casa |
| 16 | Grande |
| 17 | Grande |
| 18 | Grande |
| 19 | Grande |
| 20 | Grande |

House (label for table above)

Probability(house=casa): 15/20 = 0.75

Probability(house=grande): 5/20 = 0.25

FIG. 11B

SYSTEMS AND METHODS FOR SEARCHING USING QUERIES WRITTEN IN A DIFFERENT CHARACTER-SET AND/OR LANGUAGE FROM THE TARGET PAGES

RELATED APPLICATIONS

This application is a continuation-in-part of U.S. patent application Ser. No. 09/748,431, entitled "METHODS AND APPARATUS FOR PROVIDING SEARCH RESULTS IN RESPONSE TO AN AMBIGUOUS SEARCH QUERY," filed Dec. 26, 2000 now U.S. Pat. No. 7,136,854, which claims priority under 35 U.S.C. §119(e) to U.S. Provisional Application Ser. No. 60/216,530, entitled "DATA ENTRY AND SEARCH FOR HANDHELD DEVICES," filed Jul. 6, 2000, both of which are hereby incorporated by reference in their entirety.

BACKGROUND OF THE INVENTION

1. Field of the Invention

The present invention relates generally to information search and retrieval. More specifically, systems and methods are disclosed for performing searches using queries that are written in a character set or language that is different from the character set or language of at least some of the documents that are to be searched.

2. Description of Related Art

Most search engines operate under the assumption that the end user is entering search queries using something like a conventional keyboard, where the input of alphanumeric strings is not difficult. As small devices become more common, however, this assumption is not always valid. For example, users may query search engines using a wireless telephone that supports the WAP (Wireless Application Protocol) standard. Devices such as wireless telephones typically have a data input interface wherein a particular action by the user (e.g., pressing a key) may correspond to more than one alphanumeric character. A detailed description of WAP architecture is available at www1.wapforum.org/tech/documents/SPEC-WAPArch-19980439.pdf ("WAP 100 Wireless Application Protocol Architecture Specification").

In the usual case, the WAP user navigates to the search query page, and is presented with a form into which they input their search query. With conventional methods, the user may be required to press multiple keys to select a particular letter. On a standard telephone keypad, for example, the user would select the letter "b" by pressing the "2" key twice, or would select the letter "s" by pressing the "7" key four times. Accordingly, to enter a query for "ben smith", the user would ordinarily need to enter the following string of key presses: 2233660777764444844, which map to letters as follows:

22→b
33→e
66→n
0→space
7777→s
6→m
444→i
8→t
44→h

After the user has entered their search request, the search engine receives the word or words from the user, and proceeds in much the same manner as if it had received the request from a desktop browser wherein the user employed a conventional keyboard.

As can be seen from the foregoing example, this form of data entry is inefficient in that it requires eighteen keystrokes to enter the nine alphanumeric characters (including the space) corresponding to "ben smith".

Similar difficulties may arise when typing queries using non-target-language keyboards. For example, Japanese text can be expressed using a variety of different character sets, including hiragana, katakana, and kanji, none of which are easily entered using a typical ASCII keyboard based on the Roman alphabet. In such a situation, the user will often make use of a word-processor such as Ichitaro, produced by Just-System Corp. of Tokushima City, Japan, that is able to convert text written in romaji (a phonetic, Roman-alphabet representation of Japanese) to katakana, hiragana, and kanji. Using the word processor, the user can type a query in romaji, and then cut-and-paste the translated text from the word processor's screen into a search box on the browser. A drawback of this approach is that it can be relatively slow and tedious, and requires the user to have access to a copy of the word processor, which may not be feasible due to cost and/or memory constraints.

There remains, therefore, a need for methods and apparatus for providing relevant search results in response to an ambiguous search query.

SUMMARY OF THE INVENTION

Methods and apparatus consistent with the present invention, as embodied and broadly described herein, provide relevant search results in response to an ambiguous search query. Consistent with the invention, such a method includes receiving a sequence of ambiguous information components from a user. The method obtains mapping information that maps the ambiguous information components to less ambiguous information components. This mapping information is used to translate the sequence of ambiguous information components into one or more corresponding sequences of less ambiguous information components. One or more of these sequences of less ambiguous information are provided as an input to a search engine. The search results are obtained from the search engine and are presented to the user.

In addition, systems and methods are disclosed for performing searches using queries that are expressed in character sets or languages that are different from the character set or language of at least some of the documents that are to be searched. Embodiments of the present invention allow users to type queries using standard input devices (e.g., ASCII keyboards), have the queries translated into the relevant forms at a server (e.g., translate a query written in romaji into katakana, hiragana, and/or kanji), and receive search results based on the converted forms.

It should be appreciated that the present invention can be implemented in numerous ways, including as a process, an apparatus, a system, a device, a method, or a computer readable medium such as a computer readable storage medium, carrier wave, or a computer network wherein program instructions are sent over optical or electronic communication lines. Several inventive embodiments are described below.

In one embodiment, a method is described for automatically translating query terms from one language and/or character set to another. A first set of anchor text containing a given query term is identified, as are a set of documents (e.g., web pages) to which the anchor text point. A second set of anchor text, written in a second format and pointing to the same set of documents, is then identified. The second set of anchor text is then analyzed to obtain a probability that a representation of the given query term in the first format corresponds to a representation of the given query term in the second format.

In another embodiment, a probabilistic dictionary is created that maps terms written in a first format (e.g., a language and/or character set) to a second format (e.g., another language and/or character set). The probabilistic dictionary is used to translate a query written in the first format into the second format. The translated query is then used to perform a search, the results of which are returned to the user. In some embodiments, the user's interaction with the search results can be monitored, and used to update the probabilities in the probabilistic dictionary. Also, in some embodiments the query itself could, prior to the search, be expanded to include alternative language and/or character set mappings.

In yet another embodiment, a method for creating a probabilistic dictionary is described. The probabilistic dictionary can be used to translate terms in a first format into a second format. The dictionary is preferably created term-by-term, by identifying anchor text or other data containing the term. Next, data that is aligned with the anchor text or other data is analyzed to determine a probability with which a given term in the first format maps onto one or more terms in the second format.

In yet another embodiment, a query provided in a first language or character set is translated into a second language or character set by comparing anchor text that contains one or more of the query terms and is written in the first language or character set with anchor text that corresponds to the first anchor text and is written in the second language or character set.

In another embodiment, a computer program product is provided for translating a term written in a first format into a second format. The computer program product is operable to cause a computer system to identify aligned anchor text and to determine a probability that a representation of a given term in the first format corresponds to one or more terms in the second format.

In another embodiment, a method is provided for performing searches using potentially ambiguous queries. When a user enters a query in a first format, it is translated into a group of one or more variants written in a second format. A search is then performed using the translated variants, and responsive information is returned to the user. For example, the first format might comprise a sequence of numbers entered using a telephone keypad, and the second format might comprise alphanumeric text (e.g., English, romaji, romaja, pinyin, or the like). In some embodiments, the group of one or more variants is selected by discarding translated variants that do not appear in a predefined lexicon, and/or that contain predefined low-probability character combinations. In some embodiments, a probabilistic dictionary is used to further translate the group of one or more variants into a third format before the search is performed. For example, the probabilistic dictionary can be used to translate the group of one or more variants from romaji, romaja, or pinyin into kanji, katakana, hiragana, hangul, hanja, or traditional Chinese characters, and a search can then be performed using the translated variants.

These and other features and advantages of the present invention will be presented in more detail in the following detailed description and the accompanying figures which illustrate by way of example the principles of the invention.

BRIEF DESCRIPTION OF THE DRAWINGS

The accompanying drawings, which are incorporated in, and constitute a part of, this specification illustrate embodiments of the invention and, together with the description, serve to explain the advantages and principles of the invention. In the drawings:

FIG. 4a illustrates a conventional alphanumeric index;

FIG. 8 illustrates a probabilistic dictionary of character-set translations.

FIGS. 11A and 11B illustrate the calculation of likely translations based on the anchor text shown in FIG. 10.

DESCRIPTION OF SPECIFIC EMBODIMENTS

Reference will now be made in detail to embodiments of the present invention as illustrated in the accompanying drawings. The same reference numbers may be used throughout the drawings and the following description to refer to the same or like parts. The following description is presented to enable any person skilled in the art to make and use the inventive body of work. Descriptions of specific embodiments and applications are provided only as examples, and various modifications will be readily apparent to those skilled in the art. For example, although many of the examples are described in the context of Internet web pages, it should be understood that embodiments of the present invention could be used to search other types of documents and/or information, such as books, newspapers, magazines, or the like. Similarly, although for the sake of illustration many of the examples describe the translation of Japanese text from romaji to katakana, hiragana, and/or kanji, those of ordinary skill in the art will appreciate that the systems and methods of the present invention can be applied to any suitable translation. For example, without limitation, embodiments of the present invention could be used to search text written in, e.g., traditional Chinese characters or Korean hangul or hanja characters, based on queries received in some other format (e.g., pinyin or romaja). The general principles described herein may be applied to other embodiments and applications without departing from the spirit and scope of the invention. Thus, the present invention is to be accorded the widest scope, encompassing numerous alternatives, modifications, and equivalents consistent with the principles and features disclosed herein. For purpose of clarity, details relating to technical material that is known in the fields related to the invention have not been described in detail so as not to unnecessarily obscure the present invention.

A. OVERVIEW

Methods and apparatus consistent with the invention allow a user to submit an ambiguous search query and to receive potentially disambiguated search results. In one embodiment, a sequence of numbers received from a user of a standard telephone keypad is translated into a set of potentially corresponding alphanumeric sequences. These potentially corresponding alphanumeric sequences are provided as an input to a conventional search engine, using a boolean "OR" expression. In this manner, the search engine is used to help limit search results to those in which the user was likely interested.

B. ARCHITECTURE

Figure 1:
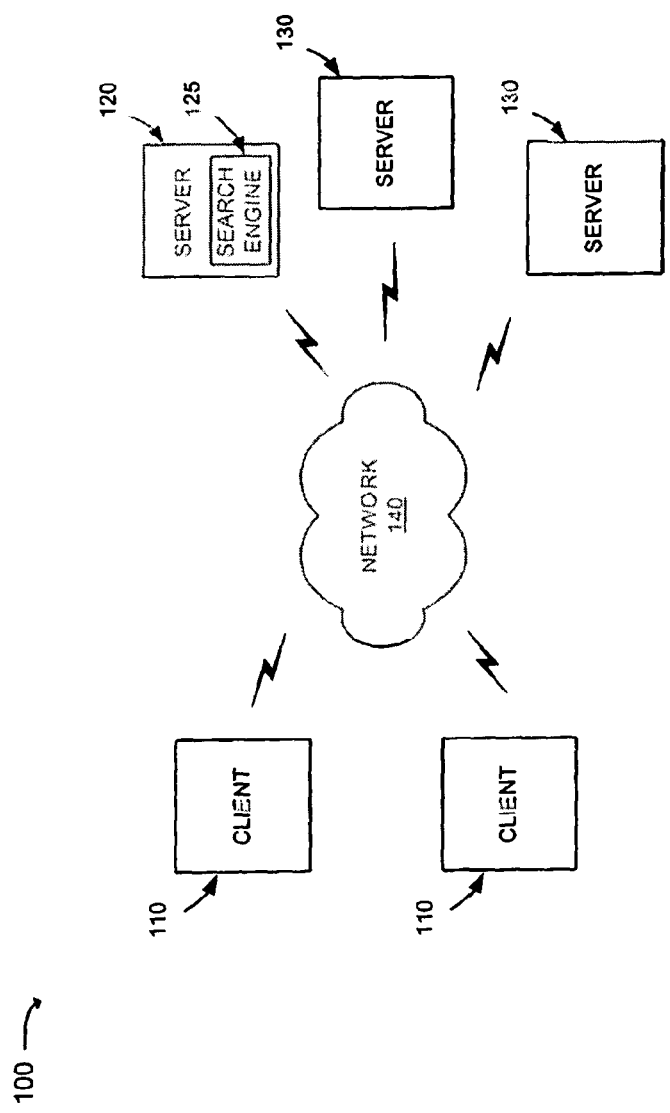
FIG. 1 illustrates a block diagram of a system in which methods and apparatus consistent with the present invention map be implemented.

FIG. 1 illustrates a system 100 in which methods and apparatus, consistent with the present invention, may be implemented. The system 100 may include multiple client devices 110 connected to multiple servers 120 and 130 via a network 140. The network 140 may include a local area network (LAN), a wide area network (WAN), a telephone network, such as the Public Switched Telephone Network (PSTN), an intranet, the Internet, or a combination of networks. Two client devices 110 and three servers 120 and 130 have been illustrated as connected to network 140 for simplicity. In practice, there may be more or less client devices and servers. Also, in some instances, a client device may perform the functions of a server and a server may perform the functions of a client device.

The client devices 110 may include devices, such as mainframes, minicomputers, personal computers, laptops, personal digital assistants, or the like, capable of connecting to the network 140. The client devices 110 may transmit data over the network 140 or receive data from the network 140 via a wired, wireless, or optical connection.

Figure 2:
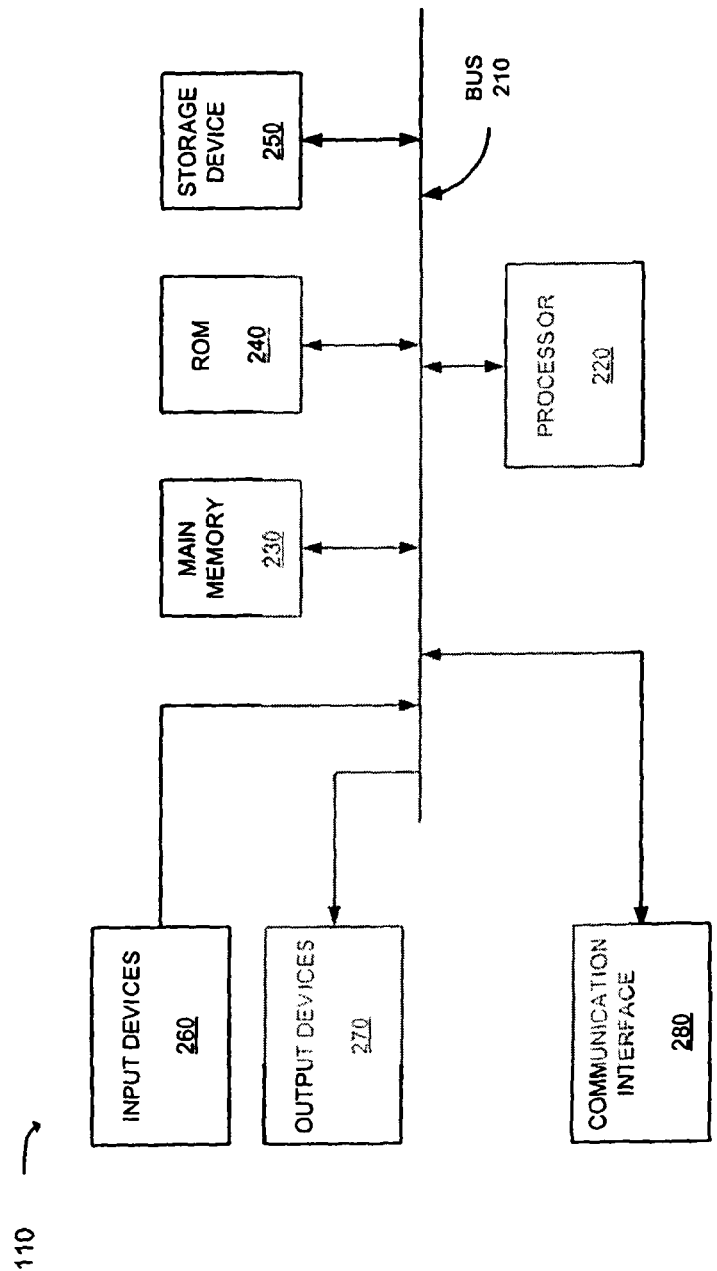
FIG. 2 illustrates a block diagram of a client device, consistent with the invention.

FIG. 2 illustrates an exemplary client device 110 consistent with the present invention. The client device 110 may include a bus 210, a processor 220, a main memory 230, a read only memory (ROM) 240, a storage device 250, an input device 260, an output device 270, and a communication interface 280.

The bus 210 may include one or more conventional buses that permit communication among the components of the client device 110. The processor 220 may include any type of conventional processor or microprocessor that interprets and executes instructions. The main memory 230 may include a random access memory (RAM) or another type of dynamic storage device that stores information and instructions for execution by the processor 220. The ROM 240 may include a conventional ROM device or another type of static storage device that stores static information and instructions for use by the processor 220. The storage device 250 may include a magnetic and/or optical recording medium and its corresponding drive.

The input device 260 may include one or more conventional mechanisms that permit a user to input information to the client device 110, such as a keyboard, a mouse, a pen, voice recognition and/or biometric mechanisms, etc. The output device 270 may include one or more conventional mechanisms that output information to the user, including a display, a printer, a speaker, etc. The communication interface 280 may include any transceiver-like mechanism that enables the client device 110 to communicate with other devices and/or systems. For example, the communication interface 280 may include mechanisms for communicating with another device or system via a network, such as network 140.

As will be described in detail below, the client devices 110, consistent with the present invention, perform certain searching-related operations. The client devices 110 may perform these operations in response to processor 220 executing software instructions contained in a computer-readable medium, such as memory 230. A computer-readable medium may be defined as one or more memory devices and/or carrier waves. The software instructions may be read into memory 230 from another computer-readable medium, such as the data storage device 250, or from another device via the communication interface 280. The software instructions contained in memory 230 causes processor 220 to perform search-related activities described below. Alternatively, hardwired circuitry may be used in place of or in combination with software instructions to implement processes consistent with the present invention. Thus, the present invention is not limited to any specific combination of hardware circuitry and software.

The servers 120 and 130 may include one or more types of computer systems, such as a mainframe, minicomputer, or personal computer, capable of connecting to the network 140 to enable servers 120 and 130 to communicate with the client devices 110. In alternative implementations, the servers 120 and 130 may include mechanisms for directly connecting to one or more client devices 110. The servers 120 and 130 may transmit data over network 140 or receive data from the network 140 via a wired, wireless, or optical connection.

The servers may be configured in a manner similar to that described above in reference to FIG. 2 for client device 110. In an implementation consistent with the present invention, the server 120 may include a search engine 125 usable by the client devices 110. The servers 130 may store documents (or web pages) accessible by the client devices 110.

C. ARCHITECTURAL OPERATION

Figure 3:
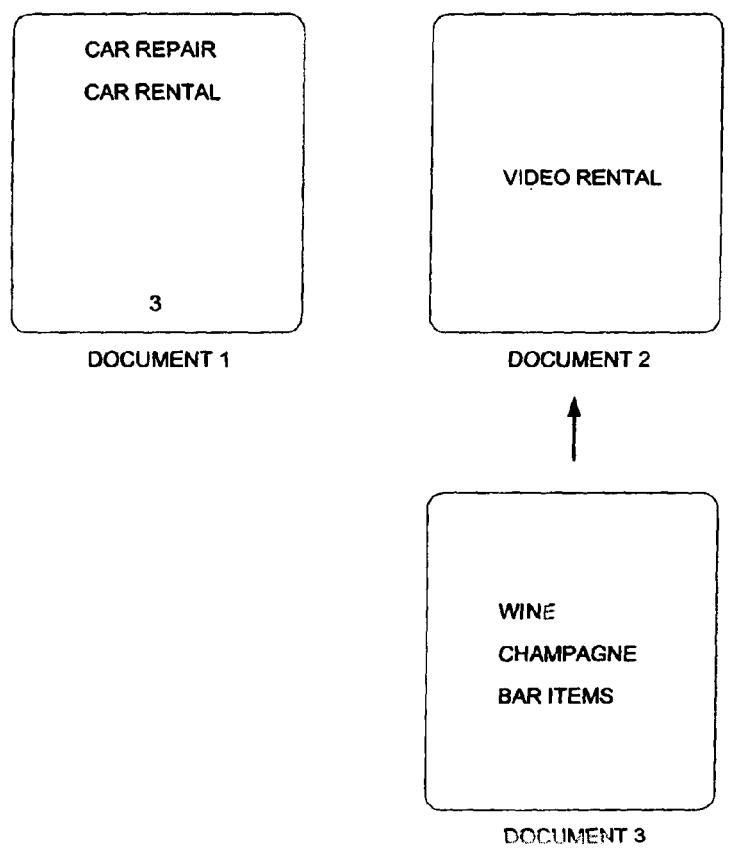
FIG. 3 illustrates a diagram depicting three documents.

FIG. 3 illustrates a diagram depicting three documents, which may be stored for example on one of the servers 130.

A first document (Document 1) contains two entries—"car repair" and "car rental"—and is numbered "3" at its bottom. A second document (Document 2) contains the entry "video rental". A third document (Document 3) contains three entries—"wine", "champagne", and "bar items"—and includes a link (or reference) to Document 2.

For the sake of illustrative simplicity, the documents shown in FIG. 3 only contain alphanumeric strings of information (e.g., "car", "repair", "wine", etc.). Those skilled in the art will recognize, however, that in other situations the documents could contain other types of information, such as phonetic, or audiovisual information.

FIG. 4a illustrates a conventional alphanumeric index, based on the documents shown in FIG. 3. The first column of the index contains a list of alphanumeric terms, and the second column contains a list of the documents corresponding to those terms. Some terms, such as the alphanumeric term "3", only correspond to (e.g., appear in) one document—in this case Document 1. Other terms, such as "rental", correspond to multiple documents—in this case Documents 1 and 2.

Figure 4B:
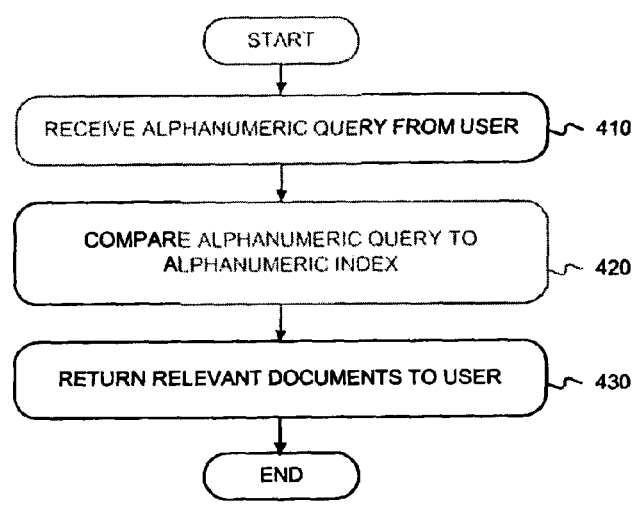
FIG. 4b illustrates a flow diagram for providing search results in response to a conventional alphanumeric search query.

FIG. 4b illustrates how a conventional search engine, such as search engine 125, would use the index illustrated in FIG. 4a to provide search results in response to an alphanumeric search query. The alphanumeric query may be generated using any conventional technique. For purposes of illustration, FIG. 4b depicts two alphanumeric queries: "car" and "wine". Under a conventional approach, search engine 125 receives an alphanumeric query, such as "car" (stage 410), and uses the alphanumeric index to determine which documents correspond to that query (stage 420). In this example, a conventional search engine 125 would use the index illustrated in FIG. 4a to determine that "car" corresponds to Document 1 and would return Document 1 (or a reference to it) to the user as a search result. Similarly, a conventional search engine would determine that "wine" corresponds to Document 3 and would return Document 3 (or a reference to it) to the user (stage 430).

Figure 5A:
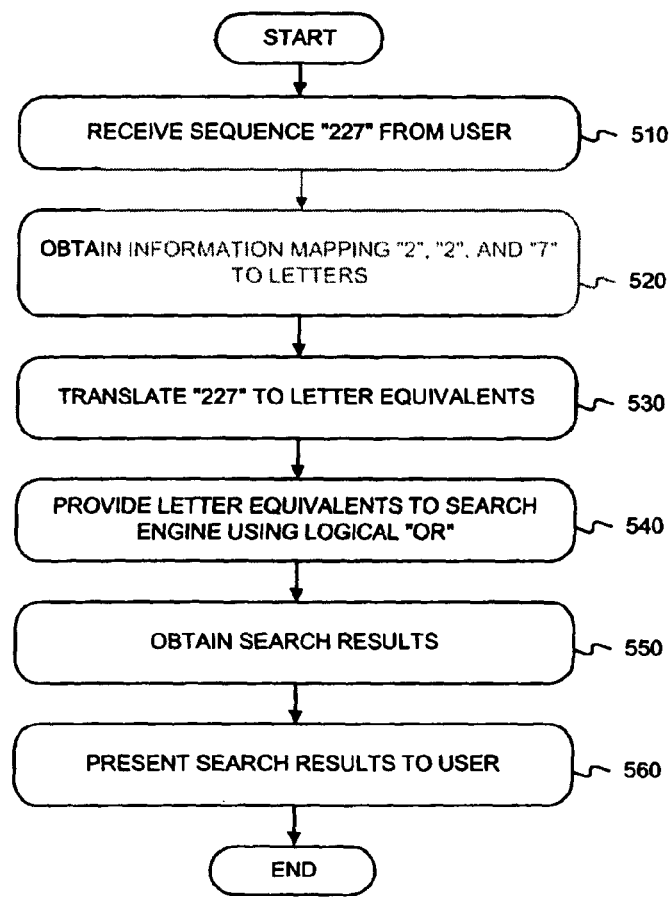
FIG. 5a illustrates a flow diagram, consistent with the invention, for providing search results in response to an ambiguous search query.

FIG. 5a illustrates a flow diagram, consistent with the invention, of a preferred technique for providing search results in response to a numeric search query, based on the documents and index shown in FIGS. 3 and 4a, respectively. For the sake of illustrative ease, FIG. 5a describes a particular technique for processing a numeric query based on the mapping of a standard telephone handset; but those skilled in the art will recognize that other techniques consistent with the invention may be used.

Figure 5B:
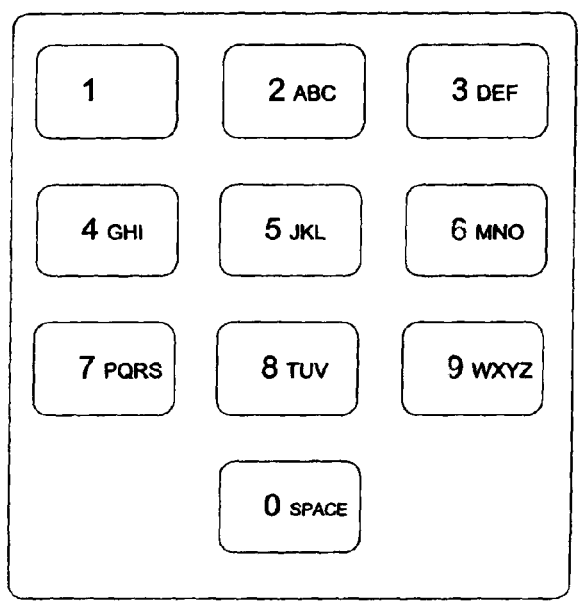
FIG. 5b illustrates a diagram for mapping alphanumeric information to numeric information.

At stage 510, a sequence "227" (consisting of numeric components "2", "2", and "7") is received from a user. At stage 520, information is obtained about how the numeric components map to letters. Assuming that the user entered the information from a standard telephone keypad, this mapping information is shown in FIG. 5b. As shown in FIG. 5b, the letters "a", "b", and "c" each map to the number "2", the letters "p", "q", "r", and "s" each map to the number "7", and so forth.

At stage 530, using this mapping information, the sequence "227" is translated into its potential alphanumeric equivalents. Based on the information shown in FIG. 5b, there exist 36 possible combinations of letters that correspond to the sequence "227", including the following: aap, bap, cap, abp, bbp, . . . bar . . . car . . . ccs. If numbers are included in the possible combinations (e.g., "aa7"), there would exist 80 possible combinations. Rather than generating all possible alphanumeric equivalents, it may be desirable to limit the generated equivalents based on some lexicon. For example, it may be desirable to generate only those alphanumeric equivalents that appear in a dictionary, search engine log of previous search queries, etc.; or to otherwise limit the alphanumeric equivalents by using known statistical techniques (e.g., the probability of certain words appearing together).

At stage 540, these alphanumeric equivalents are provided as an input to a conventional search engine, such as that described in reference to FIGS. 4a and 4b, using a logical "OR" operation. For example, the search query provided to the search engine could be "aap OR bap OR cap OR abp . . . OR bar . . . OR car". Although all possible alphanumeric equivalents may be provided to the search engine, a subset may instead be used by using conventional techniques to eliminate equivalents that are unlikely to be intended. For example, one could generate a narrower list of possible combinations by using techniques that draw upon probabilistic information about the usage of letters or words: one could ignore combinations that begin with "qt" but include (and favor) combinations that begin with "qu."

At stage 550, search results are obtained from the search engine. Because terms such as "aap" and "abp" do not appear in the search engine's index, they are effectively ignored. Indeed, the only terms contained within the index shown in FIG. 4b are "car" and "bar", and so the only search results returned are those that reference Documents 1 and 3. At stage 560, these search results are presented to the user. The search results may be presented in the same order provided by the search engine, or may be reordered based on considerations such as the language of the user. Assuming that the user was only interested in documents containing the term "bar", the user would receive an undesired result (Document 3) in addition to the desired result (Document 1). This may be an acceptable price to pay, however, for the benefit of the user only having to press three keys to formulate the search query.

Figure 6:
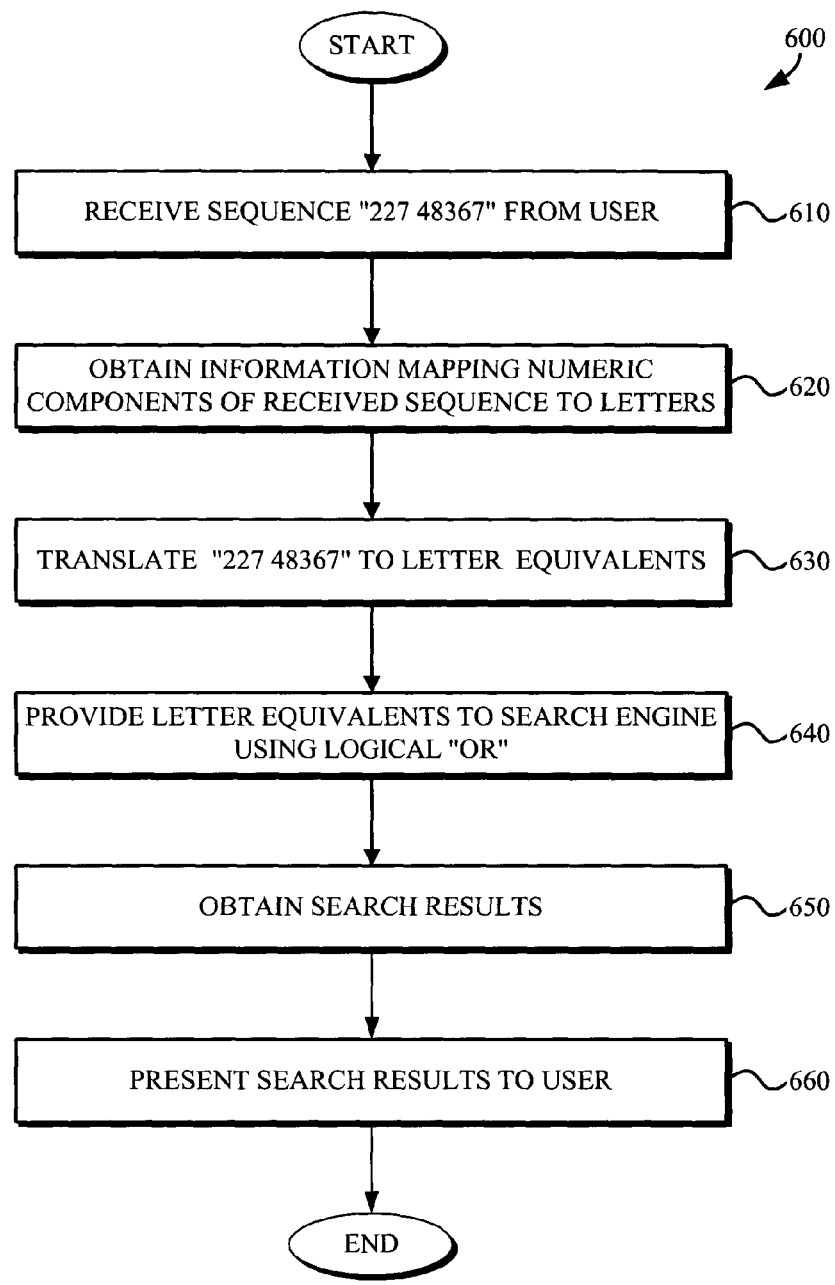
FIG. 6 illustrates another flow diagram, consistent with the invention, for providing search results in response to an ambiguous search query.

FIG. 6 illustrates another flow diagram, consistent with the invention, of a preferred technique for providing search results in response to a numeric search query, based on the documents and index shown in FIGS. 3 and 4a, respectively. This flow diagram demonstrates how increasing the size of the received sequence can help limit search results to those desired by the user. For the sake of illustrative ease, FIG. 6 again describes a particular technique for processing a numeric query based on the mapping of a standard telephone handset; but those skilled in the art will recognize that other techniques consistent with the invention may be used.

At stage 610, a sequence "227 48367" (consisting of numeric components "2", "2", "7", "4", "8", "3", "6", "7") is received from a user. For the sake of explanation, the sequence "227" will be called a "number word" and the entire sequence "227 48367" will be called a "number phrase." The possible alphanumeric equivalents of a number word will be called "letter words" and the possible alphanumeric equivalents of a number phrase will be called "letter phrases."

At stage 620, information is obtained about how the numeric components map to letters. Assuming the same mapping information is used as shown in FIG. 5b, at stage 630, the number phrase "227 48367" is translated into potentially corresponding letter phrases. Based on the information shown in FIG. 5b, there exist 11664 possible letter phrases that correspond to the sequence "227 48367".

At stage 640, these letter phrases are provided as an input to a conventional search engine, such as that described in reference to FIGS. 4a and 4b, using a logical "OR" operation. For example, the search query provided to the search engine could be "'aap gtdmp' OR 'aap htdmp' . . . OR 'bar items' . . . OR 'car items'". Although all possible letter phrases may be provided to the search engine, a subset may instead be used by employing conventional techniques to eliminate letter phrases that are unlikely to be intended.

At stage 650, search results are obtained from the search engine. Because many search engines are designed to rank highly those documents that contain the exact phrase sought, Document 3 would likely be the highest ranked search result (i.e., because it contains the exact phrase "bar items"). No other document in the example contains one of the other letter phrases generated at stage 620. Furthermore, many search engines downweight (or eliminate) search results that contain individual parts of a phrase but not the entire phrase. For example, Document 1 would be downweighted or eliminated because it contains the letter word "car", which corresponds to the first part of the letter phrase, but it does not contain any letter word that corresponds to the second part of the letter phrase. Finally, letter phrases such as "aap htdmp" are effectively ignored because they contain no letter words that appear in the search engine's index.

At stage 660, the search results are presented to the user. In the example shown, the first result shown to the user would be Document 3, which is likely most relevant to the user's query. Document 1 may be eliminated altogether, because it does not contain one of the possible letter phrases. In this manner, the user is provided with the most relevant search results.

Although the descriptions above in reference to FIGS. 5 and 6 are made in reference to receiving numeric information and mapping it to alphanumeric information, those skilled in the art will recognize that other implementations are possible consistent with the invention. For example, instead of receiving a sequence of numbers corresponding to the keys pressed by a user, the received sequence may consist of the first letters corresponding to the keys pressed by the user. In other words, instead of receiving "227", the received sequence may be "aap". Consistent with the invention, the equivalent letter sequences generated in stages 530 or 630 could then be other letter sequences (e.g., "bar") that correspond to "aap." Indeed, the received sequence may contain phonetic, audiovisual, or any other type of information components.

Regardless of the form in which the sequence is received, it is generally preferred that the received sequence be translated into a sequence that corresponds to the format in which information is stored in the search engine's index. For example, if the search engine's index is stored in alphanumeric format, the received sequence should be translated into alphanumeric sequences.

Furthermore, it is generally preferred that the mapping technique that is used to translate the received sequence of information components be the same technique that is employed at the user's device to map the user's input to the information generated by the device. There may, however, be instances where it is preferable to use a different mapping technique than is used for user input.

Embodiments of the present invention can also enable users to perform searches entered using non-target-language keyboards. For example, a web page containing Japanese text may be written in kanji, while a user attempting to search that page may only have access to a standard ASCII keyboard (or handset) based on the Roman alphabet.

Figure 7:
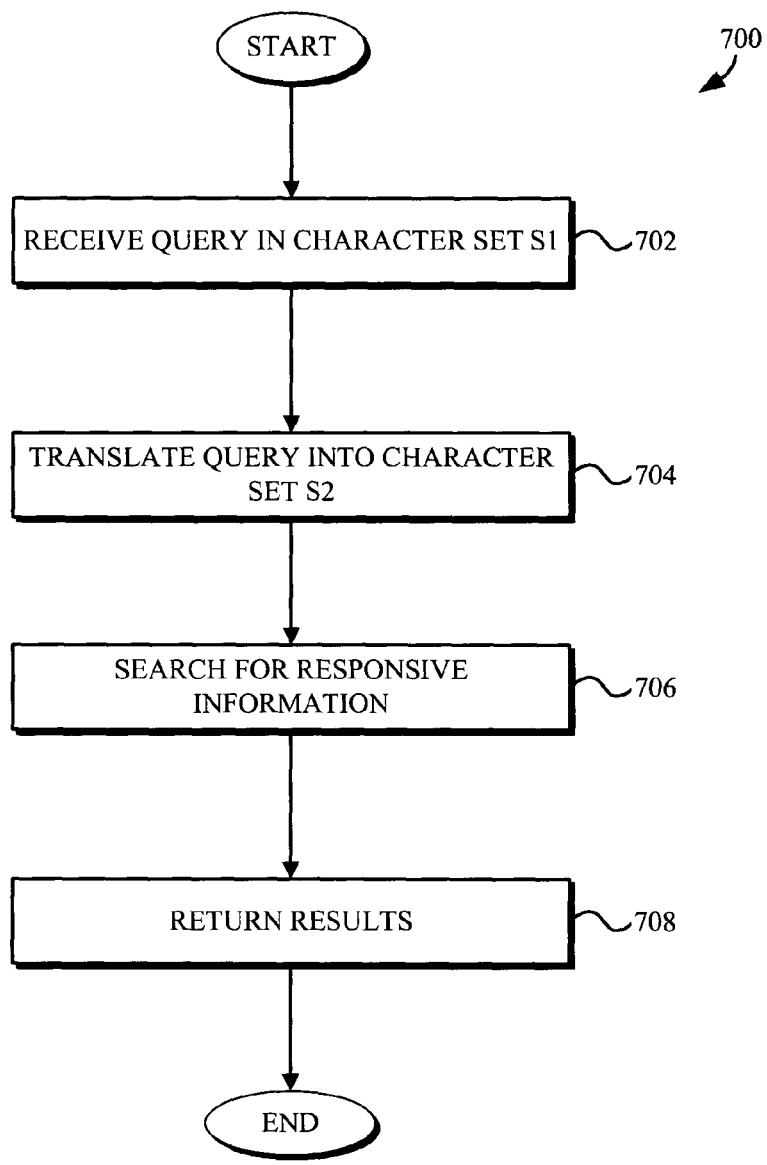
FIG. 7 illustrates a method for performing a search in accordance with embodiments of the present invention.

FIG. 7 illustrates a method for performing such a search. As shown in FIG. 7, a user types a query using a standard input device (e.g., an ASCII keyboard, a telephone handset, etc.), and sends the query to the search engine. The query may be written in a character set (e.g., romaji) that is different from the character set in which some of the responsive documents are written (e.g., kanji). The search engine receives the query (block 702), translates it into the relevant form(s) (block 704), and performs a search for documents responsive to the translated query using, e.g., conventional search techniques (block 706). The search engine then returns a list of responsive documents (and/or copies of the documents themselves) to the user (block 708). For example, results could be returned to the user in a manner similar to that described above in connection with FIG. 6.

As shown in FIG. 7, the user's query is preferably translated at the search engine's server, as opposed to the client, thus relieving the user of the need to obtain special-purpose software to perform the translation. However, it will be appreciated that in other embodiments, some or all of the translation could be performed at the client. In addition, in some embodiments the query may be entered using a device such as a telephone keypad. In such embodiments, the initial, numeric query may first be converted to alphanumeric form (e.g., romaji) using the mapping techniques described above in connection with FIGS. 5 and 6, including, for example, the application of a lexicon and/or probabilistic techniques to discard low probability mappings (e.g., mappings that include letter combinations that do not occur in romaji). Once an alphanumeric translation of the query has been obtained, the remainder of the steps shown in FIG. 7 could be performed (i.e., 704, 706, and 708).

The translation of the query from one character set or language into another (i.e., block 704 in FIG. 7) can be performed in a variety of ways. One technique is to use a conventional, static dictionary of word meanings or translations to map each term in the query to a corresponding term in the target language or character set. A problem with this approach, however, is that it will often yield inaccurate results, since words are often ambiguous, and queries will often be too short to provide adequate contextual clues to resolve this ambiguity. For instance, the word "bank" can refer to a river bank, a financial institution, or a maneuver by an airplane, thus making it difficult to translate accurately in the abstract. In addition, if the dictionary is not relatively large and/or frequently updated, it may not contain entries for all the terms that the search engine may encounter, such as seldom-used words, slang, idioms, proper names, and the like.

Embodiments of the present invention can be used to overcome or ameliorate some or all of these problems by using a probabilistic dictionary to translate query terms from one language or character set (e.g., ASCII) to another (e.g., kanji). In a preferred embodiment, the probabilistic dictionary maps one set of terms to another set of terms, and associates a probability with each of the mappings. For convenience, a "term" or "token" will refer to words, phrases, and/or (more generally) sequences of one or more characters that may include spaces.

FIG. 8 shows an example of a probabilistic dictionary 800 such as that described above. The example probabilistic dictionary 800 shown in FIG. 8 maps words written in romaji (a Roman alphabet representation of Japanese) to words written in kanji (a non-Roman, ideogram-based Japanese character set). To facilitate explanation, FIG. 8 depicts romaji terms as "<term>$_{romaji}$", and kanji terms as "<term>$_{kanji}$". It will be appreciated that in an actual romaji to kanji dictionary, actual romaji and kanji terms would be used, rather than the English translations shown in FIG. 8. Thus it will be appreciated that FIG. 8 is provided to facilitate an explanation of embodiments of the present invention, and not to illustrate the actual characteristics and meaning of Japanese text.

Dictionary 800 contains entries 808, 810, 812, 814 for various romaji terms 802. The dictionary also contains potential representations of each of these terms in kanji 804, along with a corresponding probability 806 that each such representation is correct. For example, the romaji term "bank" might map to a kanji term meaning "steep slope" with probability 0.3, to a term meaning "financial institution" with probability 0.4, and to a term meaning "airplane maneuver" with probability 0.2. With probability 0.1, the term might map to "other," which is simply a generic way of allowing each term to map to terms that may not be in the dictionary.

Again, it will be appreciated that the example shown in FIG. 8 has been constructed to illustrate that a given term (e.g., the word "bank") in a first character set or language, may map to more than one term in another character set or language. One of skill in the art will appreciate, however, that while for the sake of clarity the particular example in FIG. 8 illustrates this principle using English words and meanings, the actual romaji representation of the word "bank," for example, may not be ambiguous in the same fashion as its English equivalent (e.g., there may be no ambiguity in romaji between the word for a financial institution and the word for an airplane maneuver). It should also be appreciated that, to facilitate explanation, the dictionary shown in FIG. 8 has been simplified in other respects as well. For example, an actual probabilistic dictionary might contain many more potential mappings for each term, or might only contain mappings that exceed a predefined probability threshold.

Preferred embodiments of the present invention use such a probabilistic dictionary to translate queries expressed in one language and/or character set into another language and/or character set, thereby enabling users to find documents written in a different character set and/or language than their original query. For example, if the user enters a query for "cars" in romaji, the probabilistic dictionary can be used to map the romaji term for "cars" to, e.g., the kanji term for "cars." In this way, users can find documents related to their queries, even if the character set of the queries (e.g., romaji) and the character set of the matching documents (e.g., kanji) are not be the same. Note that in this particular example, the actual language of the query is not changed (both romaji and kanji are used to express Japanese), only the character encoding.

As yet another example, the term "tired" in ASCII English could map to the term "made" in German using a Latin 1 character encoding, since the character umlaut-u does not exist in ASCII. Note that in this example the dictionary provides both a translation into another language (English to German) and a translation into another character encoding (ASCII to Latin 1).

In preferred embodiments, the mapping dictionary described above is built in an automatic manner, using information available on the web in conjunction with statistical techniques. Preferred embodiments use parallel, aligned bilingual corpora, such as anchor text written in different languages and/or character sets, to arrive at accurate translations. Using this data, preferred embodiments can construct a dictionary of potential word mappings. This can be done, for example, by simply counting the number of times a token in language $S_i$ (source language) occurs at the same time as a token $T_j$ (target language) in aligned text pairs (e.g., anchors, sentences, etc.). It will be appreciated, however, that any suitable technique could be used.

In the absence of sufficiently large and correctly aligned data sets, this method may generate relatively ambiguous many-to-many mappings. Thus, for instance, it may be determined only that $S_1$ could map to $T_2$, $T_3$, $T_7$, and $T_8$ with some probability. However, this is acceptable, and, as described in more detail below, in some embodiments additional refinements can be made to increase the respective likelihood of each of the mappings, e.g., by examining previous user queries, the user's selection of items on the results page, and/or the like.

Figure 9:
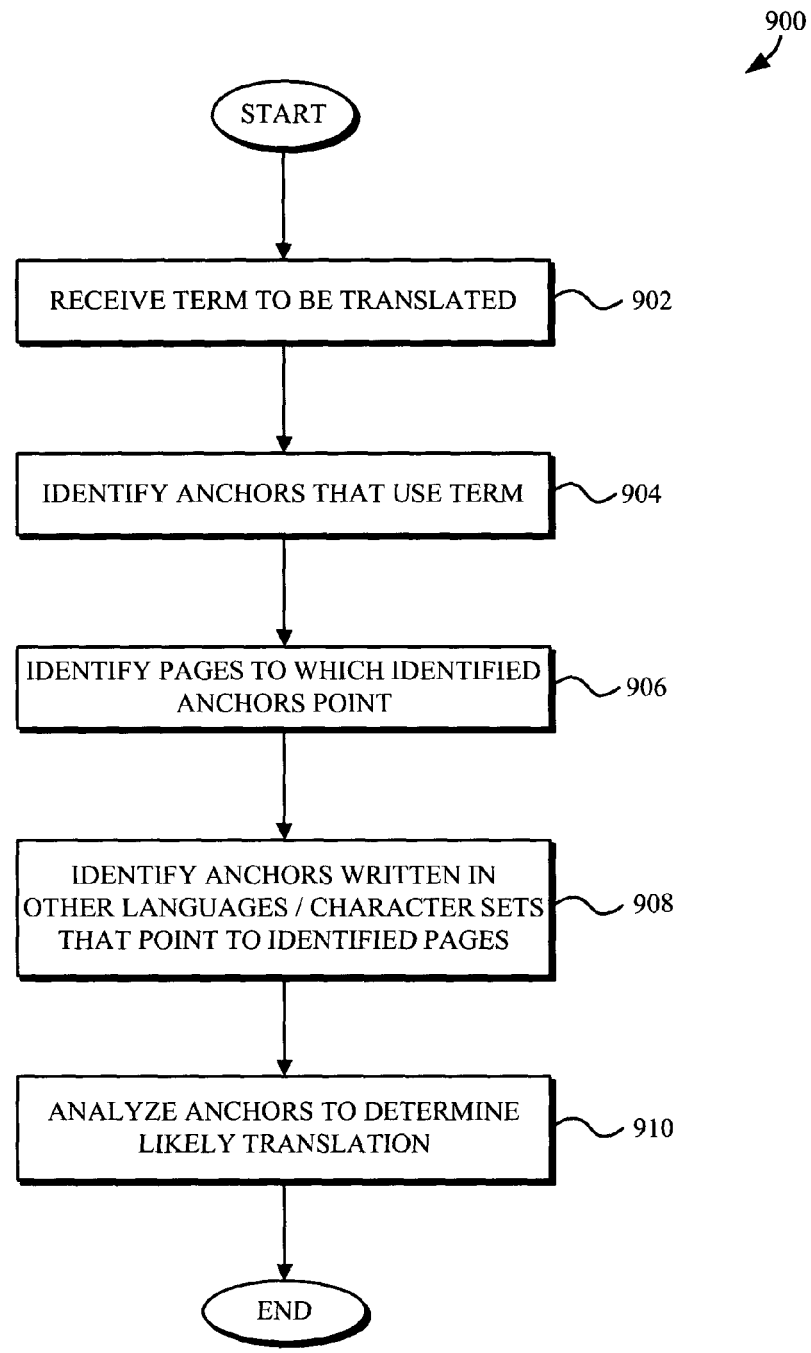
FIG. 9 illustrates the use of parallel anchor text to build a probabilistic dictionary.

FIG. 9 illustrates the use of parallel anchor text to build a probabilistic dictionary. Anchor text comprises the text associated with a hyperlink between web pages (or locations within a given web page). For example, in the hypertext markup language (HTML), the command: "<A href="http://www.abc.com">Banks and Savings and Loans</A>" causes the text "Banks and Savings and Loans" to be displayed as a hyperlink pointing to the web page found at http://www.abc.com. The text "Banks and Savings and Loans" is called anchor text, and typically provides a short description of the web page to which it points (e.g., www.abc.com). Indeed, anchor text will often provide a more accurate description of a web page than the page itself, and thus can be particularly useful in determining the nature of the web page to which it points. In addition, the word usage and distribution in anchor text is often closer in spirit and length to that found in user queries. It is also the case that many of the anchors pointing to a given page will contain the same, or highly similar text. For example, anchors pointing to www.google.com will often simply say "Google," or will at least use this term along with other text. Thus, by examining all, e.g., katakana, anchors that point to www.google.com, a katakana translation for "Google" can be inferred with a relatively high degree of confidence by simply looking for the term that appears with the highest frequency (possibly after discarding certain predefined, low information-content anchors, such as ones that simply say "click here"). Preferred embodiments of the present invention take advantage of these characteristics of anchor text to provide accurate translations.

Referring to FIG. 9, upon receiving a query containing a term written in a first character set (e.g., ASCII) (block 902), the server identifies a set of anchor text in which the term appears (block 904). For example, the server may examine an index of all known anchors to identify those anchors that contain the term. Next, the web pages to which those anchors point are identified (block 906), as are any anchors written in the target language or target character set (e.g., hiragana, katakana, and/or kanji) that point to these pages (block 908). The system will now have two sets of documents (where anchor text is considered to be a form of document). The distribution of the query term in one document set (e.g., the anchors that contain the original ASCII query) is then used to identify the most likely candidates for the translated phrase in the other document set (e.g., the parallel anchors). Statistics can be computed regarding the frequency with which the anchor text terms appear, and these statistics can be used to determine the relative frequencies or probabilities of the terms found in the anchor text being the correct translation of the original query (block 910). For queries with multiple words, the process described above can be repeated for each word, or the entire query can simply be treated as a single term, or some other suitable grouping of words could be used. For example, if the query is "big houses," a dictionary of possible translations could be constructed by finding aligned anchor text that contains that phrase (or at least one of the words in the phrase). Similarly, if the query contained more than two terms, experiments to determine an appropriate mapping could be constructed by picking appropriate subsets of the query terms and generating results for those terms.

An advantage of performing a translation in the manner shown in FIG. 9 is that the translation system need not have prior knowledge of the mappings between terms in one language or character set and those in the target set. Instead, the mappings can be determined dynamically based on the body of data that is available to perform the statistical analysis. Thus, for example, it is possible to discover accurate translations for slang terms, idioms, proper names, and the like without incurring the effort or expense (e.g., linguistic analysis and research) of maintaining a conventional static dictionary.

An illustrative embodiment of the foregoing translation techniques will now be described in connection with FIGS. 10-12. In this example, it will be assumed that the user has entered the query term "house," and wishes to obtain search results written in Spanish (or simply a translation of the query term). The server will thus attempt to translate the English term "house" into its Spanish equivalent.

Figure 10:
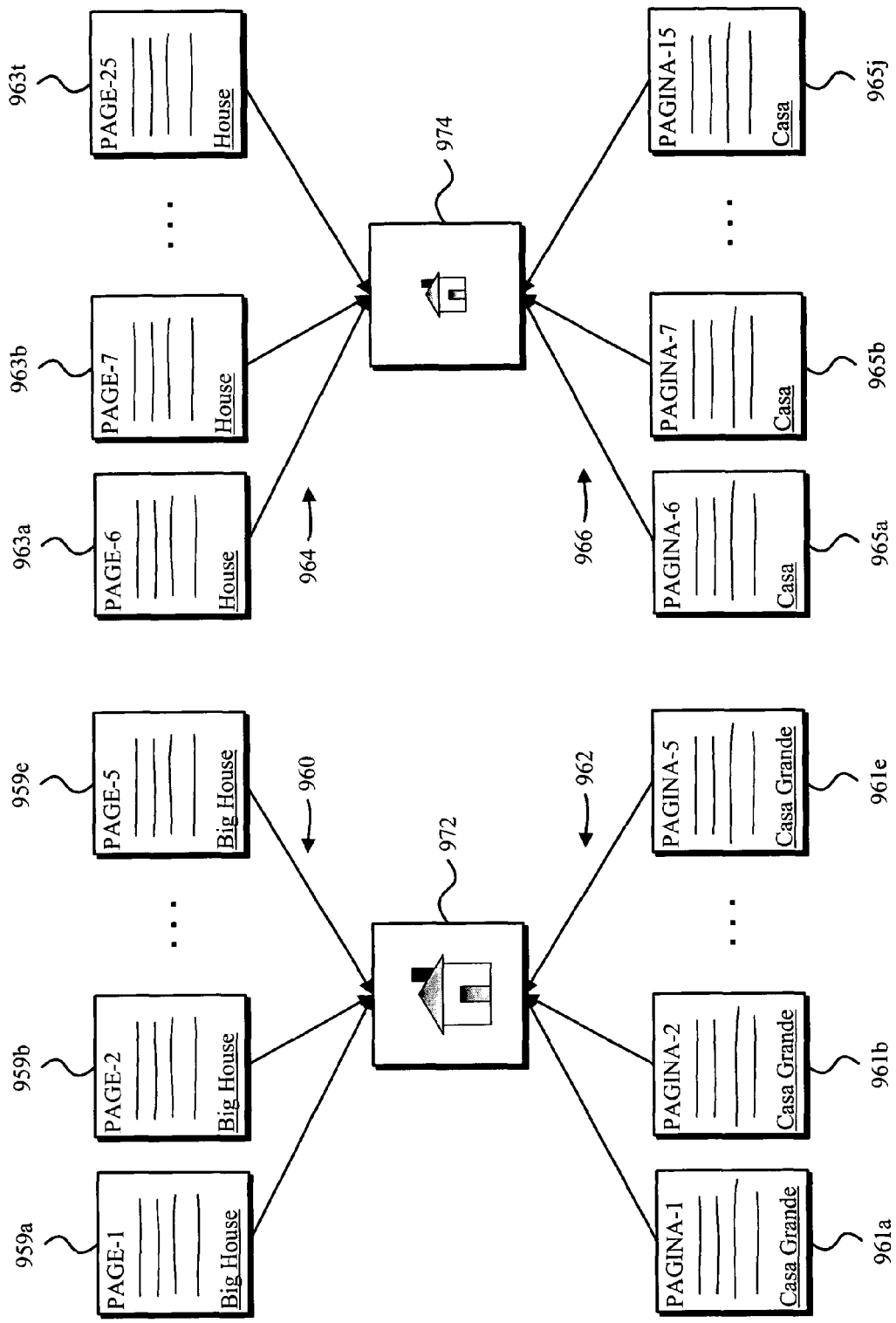
FIG. 10 illustrates a collection of documents linked using anchor text.

Referring to FIG. 10, a variety of web pages 959, 961, 963, 965 are linked via anchor text 960, 962, 964, 966 to pages 972 and 974. Some of the pages, and their associated anchor text, are written in English (i.e., pages 959*a-e* and 963*a-t*) and some are written in Spanish (i.e., pages 961*a-e* and 965*a-j*). The server first locates all anchors that use the term "house." These anchors can be located, for example, by searching an index of anchor text stored at the server. Using such an index, the server might first find the five anchors 960 that each use the phrase "big house" and point to web page 972. The server next determines that there are also five target-language (i.e., Spanish) anchors 962 that point to page 972, too. In the example shown in FIG. 10, these anchors contain the text "casa grande." Anchors that point to the same page (such as anchors 960 and anchors 962), or to pages bearing a predefined relationship thereto, are said to be "aligned," where, in a more general sense, alignment typically refers to the equivalence (or likely equivalence) of the aligned items.

FIG. 11A shows the frequency with which each target-language term appears in the target-language anchors 962. As shown in FIG. 11A, the terms "casa" and "grande" each appear five times (i.e., once in each anchor 962). Thus, out of the ten total terms that appear in the target anchors 962 (i.e., two terms per anchor in each of the five anchors), "casa" accounts for half, and "grande" accounts for the other half. Thus, as shown in FIG. 11A, at this point the term "house" could map to either "casa" or "grande" with equal probability, since both terms appear with equal frequency.

However, as shown in FIG. 10, the system also finds twenty English anchors 964 that contain the term "house" and point to page 974, and ten Spanish anchors 966 containing the term "casa" and also pointing to page 974. As shown in FIG. 11B, the term "house" will now map to "casa" with probability 0.75 (i.e., 15/20), and to "grande" with probability 0.25 (i.e., 5/20). These probabilities are calculated by simply dividing the total number of occurrences of each term in the target language anchors (i.e., fifteen, in the case of "casa") by the total number of terms—including duplicates—in the target language anchors (i.e., twenty terms: ten contained in anchors 962, and ten contained in anchors 964). Alternatively, or in addition, other techniques could be used to calculate and/or refine the probabilities of a given translation or mapping. For example, those skilled in the art will appreciate that any of a variety of well-known techniques could be used for reducing the variance error of the probability estimates, such as Bayesian methods, histogram smoothing, kernel smoothing, shrinkage estimators, and/or other estimation techniques.

If more anchor text is available, the probabilities could be refined even further. For example, a final probability distribution might be similar to that shown in FIG. 12, in which "house" maps with a relatively high probability to "casa" and its diminutive form "casita," and with somewhat lesser probability to terms like "casino" and "mansion" (the Spanish word for mansion), and with negligible probability to terms like "grande." Thus, a correct translation—as well as an identification of likely synonyms—can be obtained without knowledge of the languages and/or character sets that are being translated.

Having translated the query terms, the server can now run a search using the translation. For example, if a user were to enter a romaji query for "hotels in Kyoto," the techniques described above could be used to enable the server to infer katakana, hiragana and kanji forms of the query, perform searches using those queries, and then present the combined results for each of those query forms to the user within an appropriate user interface.

Figure 12:
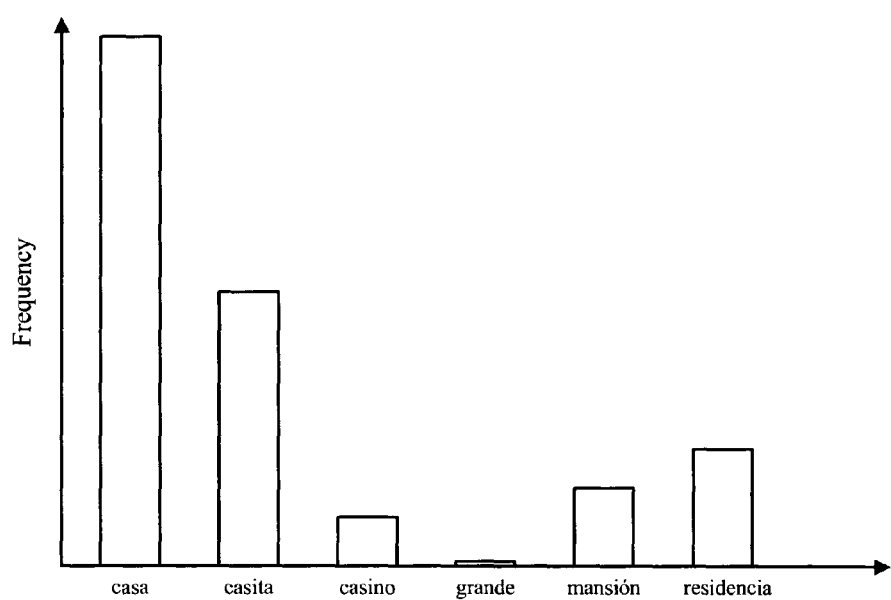
FIG. 12 shows a probability distribution associated with an illustrative word translation.

It should be appreciated that the example described in connection with FIGS. 10-12 is provided for purposes of illustration, and not limitation, and that many changes could be made to the methodology depicted therein. For example, different statistical techniques could be used to arrive at the probabilities, and/or modifications could be made to the basic techniques described above. Similarly, it should be appreciated that the translation technique described above can simply be used to perform translations of words or phrases entered by users, and need not also be used to perform an associated Internet search or to create a probabilistic dictionary. In addition, although the preceding example describes the translation process as occurring after the receipt of a user's query, it should be appreciated that in other embodiments the mapping process could be performed before the user's query is received. Such pre-computed mappings could be stored in a dictionary such as that described in FIG. 8, which would then be applied to translate user queries as they were received. Finally, it should be understood that text other than aligned anchor text could be used to perform the translation. For example, aligned sentences or other data could be used in a similar manner. In many countries there is more than one official or recognized language, and newspapers and periodicals will often contain the same article written in each of these languages. These parallel translations can be used in the same manner as the previously described anchor text to prepare probabilistic dictionaries of word translations.

Thus, preferred embodiments advantageously enable users to enter search queries and/or translation requests in a convenient manner (e.g., using an ASCII keyboard), and provide an accurate and automatic translation and search. In some embodiments, additional refinements can be made to the basic model described above. For example, in some embodiments a preference (weighting) can be given to anchors that contain a number of terms that is similar to the number of terms in the original query and/or in other aligned anchors. For example, in the system shown in FIG. 10 a preference might be given to the anchors that point to page 974, since, like the original query, they each contain a single term. Similarly, if an anchor containing the text "la casa grande" also pointed to page 972, its weighting could be discounted by an appropriate factor, since it contains more terms (i.e., 3) than the other anchors with which it is aligned. Such a weighting scheme could be reflected in the probability calculation shown in FIG. 11B by multiplying the frequencies associated with these anchors' terms by a suitable factor.

The translation process described above can also be used to improve the effectiveness of the search itself. For example, the probabilistic dictionary can be used to expand queries on the fly to include, e.g., various translations and synonyms of the original query terms. By expanding user queries prior to document retrieval, simultaneous searches for the same "concepts" can be performed, thereby increasing the likelihood that the search results will contain what the user is looking for. Alternatively, or in addition, the probabilistic dictionary can be used to supplement the normal document indexing process, by providing expansions of document terms. For example, the terms found in a document could be supplemented in the document index with translations from the probabilistic dictionary, thus increasing the probability that the document will be located even by searches that do not use precisely the same terms found in the original document.

A problem that may arise when using the translation techniques described above, is that, due to data sparsity (e.g., not enough anchors to conclusively determine that "casa" maps to "house"), or lack of diversity (e.g., all the anchors say the same thing), the system may be unable to arrive at sufficiently accurate probabilistic mappings. Thus, in some embodiments the probabilistic mappings can be further improved by examining user behavior. Several illustrative techniques are described below.

For example, assume once again that the server wishes to obtain a translation for "house." Assume, however, that the only anchor text that can be found either contains the phrase "big house" or the phrase "casa grande." Due to this lack of diversity in the anchor text, the probabilistic dictionary might arrive at the following mappings:

house→casa, with 0.5 probability
house→grande, with 0.5 probability
big→casa, with 0.5 probability
big→grande, with 0.5 probability
grande→house, with 0.5 probability
grande→big, with 0.5 probability
casa→house, with 0.5 probability
casa→big, with 0.5 probability Imagine that a user now queries the search engine with the term "casa." At this point, the search engine could return pages that contain the term "casa," and also mix in N results that contain just the term "house" and M results that contain just the term "big." In practice, N and M could be adjusted to take into account the underlying probabilities of the mappings, so that relatively unlikely mappings would result in fewer results being displayed. If users were found to click on results containing just the term "house" ten times more than they clicked on results containing just the term "big," the probabilities of the mappings could, for example, be adjusted as follows:

house→casa, with 0.9 probability
house→grande, with 0.1 probability
big→casa, with 0.1 probability
big→grande, with 0.9 probability
grande→house, with 0.1 probability
grande→big, with 0.9 probability
casa→house, with 0.9 probability
casa→big, with 0.1 probability Note that the actual numbers could depend on a variety of other factors, such as the number of users whose clicks were taken into account, the number of clicks on pages containing both the terms, the placement of the results containing the terms in question amongst the result set, and/or the like. It should also be appreciated that the adjusted probabilities given in this example (i.e., 0.1 and 0.9) are for illustrative purposes. One of skill in the art will appreciate that the actual weighting given to user feedback such as that described above could be implemented in any suitable manner.

Also note that the foregoing example has been simplified to facilitate explanation of the use of user feedback. For example, in some systems it will be possible to make use of information obtained from other translations to assist in performing a given translation. For instance, in the example that has just been presented, even if the term "house" only appeared in anchor text that said "big house," it might still be possible to determine that "house" more appropriately maps to "casa" than it does to "grande." For example, if it had already been determined that "big" mapped to "grande" with a very high probability and over a sufficiently large data set (and if it were assumed that anchor text seldom consists of a list of synonyms), then the house-to-casa mapping could still be given preference over the house-to-grande mapping, even though the anchors containing "house" or "casa" were inconclusive.

The accuracy of the translation and/or the usefulness of the search results can also be improved by examining the user's query session history. For example, in many cases the system will know (e.g., through cookies or information stored in a user's account at the server) the previous queries that the user has entered. This historical data can be used to rank possible senses of the queries from that user, thus potentially disambiguating "bank" for fishing-related queries from those related to flying. Thus, this process can be used to narrow the set of possible translations. In some embodiments the system may suggest these by displaying them in connection with a message such as "Did you mean to search for X" in the user interface (where "X" refers to the predicted translation preference), while also potentially displaying in the first page of results a small number of results from each of the possible reformulations. When a user either selects one of the alternatives suggested by the "did you mean . . . " display, or one of the results presented on the results page, the system will obtain additional evidence regarding the likely translations of the query word(s), as well as the likely search bias of the user. Both of these signals can then be used by the system to update the likelihood scores for term mappings (e.g., in the probabilistic dictionary), both in the general case as well as in the user-specific case.

D. CONCLUSION

As described in detail above, methods and systems consistent with the invention can be used to provide search results in response to ambiguous search queries and/or to translate terms into other character set and/or languages. A variety of translation and search techniques and systems have been described. However, it will be appreciated that the foregoing description has been presented for purposes of illustration, and that many modifications and variations are possible in light of the above teachings, or through practicing the invention. For example, although the foregoing description is based on a client-server architecture, those skilled in the art will recognize that a peer-to-peer architecture may be used consistent with the invention. Moreover, although the described implementation includes software, the invention may be implemented as a combination of hardware and software or in hardware alone. Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet; or other forms of RAM or ROM. The scope of the invention is therefore defined by the claims and their equivalents.

What is claimed is:

1. A computer-implemented method, the method comprising:
    receiving a search query from a user device, wherein the search query includes one or more terms, each term being written in a first format;
    translating, using a probabilistic dictionary, the one or more terms of the search query into a group of translated search queries, each translated search query having one or more terms in a second format, wherein the probabilistic dictionary includes a mapping of terms from the first format to the second format according to a respective calculated probability that a particular term in the first format corresponds to a term in the second format;
    using a search engine to identify a plurality of documents written in the second format that are responsive to the group of translated search queries;
    providing search results written in the second format to the user device, the search results referencing one or more of the identified documents;
    obtaining click data from the user device indicative of user selections of one or more of the search results written in the second format; and
    modifying the probabilistic dictionary of term mappings based at least in part on the obtained click data indicative of user selections of one or more of the search results written in the second format and adjusting at least one probability associated with at least one mapping in the probabilistic dictionary.

2. The method of claim 1, where translating the query into the second format includes expanding the search query to create an expanded search query.

3. The method of claim 2, in which the expanded search query includes alternative encodings of one or more of the search query terms.

4. The method of claim 3, in which the expanded search query includes synonyms of one or more of the alternative encodings of the search query terms.

5. The method of claim 2, in which the expanded search query includes alternative language translations of one or more of the search query terms.

6. The method of claim 2, in which the expanded search query includes alternative encodings and alternative language translations of one or more of the search query terms.

7. A system comprising:
a computer readable medium including instructions; and
data processing apparatus configured to execute the instructions to perform operations including:
receiving a search query from a user device, wherein the search query includes one or more terms, each term being written in a first format;
translating, using a probabilistic dictionary, the one or more terms of the search query into a group of translated search queries, each translated search query having one or more terms in a second format, wherein the probabilistic dictionary includes a mapping of terms from the first format to the second format according to a respective calculated probability that a particular term in the first format corresponds to a term in the second format;
using a search engine to identify a plurality of documents written in the second format that are responsive to the group of translated search queries;
providing search results written in the second format to the user device, the search results referencing one or more of the identified documents;
obtaining click data from the user device indicative of user selections of one or more of the search results written in the second format; and
modifying the probabilistic dictionary of term mappings based at least in part on the obtained click data indicative of user selections of one or more of the search results written in the second format and adjusting at least one probability associated with at least one mapping in the probabilistic dictionary.

8. The system of claim 7, in which translating the search query into the second format includes expanding the search query to create an expanded search query.

9. The system of claim 8, in which the expanded search query includes alternative encodings of one or more of the search query terms.

10. The system of claim 9, in which the expanded search query includes synonyms of one or more of the alternative encodings of the search query terms.

11. The system of claim 8, in which the expanded search query includes alternative language translations of one or more of the search query terms.

12. The system of claim 8, in which the expanded search query includes alternative encodings and alternative language translations of one or more of the search query terms.

13. A computer storage medium encoded with a computer program, the program comprising instructions that, when executed by data processing apparatus, cause the data processing apparatus to perform operations comprising:
receiving a search query from a user device, wherein the search query includes one or more terms, each term being written in a first format;
translating, using a probabilistic dictionary, the one or more terms of the search query into a group of translated search queries, each translated search query having one or more terms in a second format, wherein the probabilistic dictionary includes a mapping of terms from the first format to the second format according to a respective calculated probability that a particular term in the first format corresponds to a term in the second format;
using a search engine to identify a plurality of documents written in the second format that are responsive to the group of translated search queries;
providing search results written in the second format to the user device, the search results referencing one or more the identified documents;
obtaining click data from the user device indicative of user selections of one or more of the search results written in the second format; and
modifying the probabilistic dictionary of term mappings based at least in part on the obtained click data indicative of user selections of one or more of the search results written in the second format and adjusting at least one probability associated with at least one mapping in the probabilistic dictionary.

14. The computer storage medium of claim 13, in which translating the search query into the second format includes expanding the search query to create an expanded search query.

15. The computer storage medium of claim 14, in which the expanded search query includes alternative encodings of one or more of the search query terms.

16. The computer storage medium of claim 15, in which the expanded search query includes synonyms of one or more of the alternative encodings of the search query terms.

17. The computer storage medium of claim 14, in which the expanded search query includes alternative language translations of one or more of the search query terms.

18. The computer storage medium of claim 14, in which the expanded search query includes alternative encodings and alternative language translations of one or more of the search query terms.

* * * * *